United States Patent [19]

Hermens et al.

[11] Patent Number: 4,668,482
[45] Date of Patent: May 26, 1987

[54] RECOVERY OF URANIUM FROM SOLUTIONS

[75] Inventors: Richard A. Hermens, Lagrande, Oreg.; Jack B. Kendall; Jerry A. Partridge, both of Richland, Wash.

[73] Assignee: Advanced Nuclear Fuels Corporation, Richland, Wash.

[21] Appl. No.: 665,730

[22] Filed: Oct. 29, 1984

[51] Int. Cl.$^4$ ............................................. C01G 43/00
[52] U.S. Cl. ...................................... 423/15; 423/253
[58] Field of Search ................................. 423/15, 253

[56] References Cited

U.S. PATENT DOCUMENTS

| 2,768,059 | 10/1956 | Bailer et al. | 423/15 |
| 3,681,035 | 8/1972 | Selman et al. | 423/15 |
| 3,980,757 | 9/1976 | Dokuzoguz | 423/15 |
| 4,211,757 | 7/1980 | Watt et al. | 423/253 |

*Primary Examiner*—Edward A. Miller
*Attorney, Agent, or Firm*—Volker R. Ulbrich

[57] ABSTRACT

For the recovery of uranium from a solution in which the uranium is in valence (VI), a solution is formed containing ammonium ($NH_4^+$), fluoride ($F^-$) and sodium hydrosulfite ($Na_2S_2O_4$). This forms a precipitate ($NaNH_4UF_6$), a previously unreported compound. It can be dissolved in an aqueous solution of nitric acid, aluminum nitrate nonahydrate, $Al(NO_3)_3 \cdot 9H_2O$, or a mixture of the two. This produces uranyl nitrate hexahydrate, which can be purified by processes conventionally used for that purpose.

11 Claims, No Drawings

RECOVERY OF URANIUM FROM SOLUTIONS

BACKGROUND

This invention relates to the recovery of uranium from certain solutions.

Uranium intended for use as fuel in nuclear reactors is almost invariably enriched in the isotope U-235 while in the form of uranium hexafluoride and is shipped in that form to the fuel fabrication plants. At the plant, it is converted to uranium dioxide, $UO_2$. One of the processes used for this conversion is termed the "ammonium diuranate process (ADU)". According to this process, the $UF_6$ is first hydrolyzed with water to uranyl fluoride, $UO_2F_2$. This is then reacted with ammonium hydroxide to precipitate ammonium diuranate $(NH_4)_2U_2O_7$. The last-named compound is calcined to form $UO_2$ which is the most common reactor fuel.

While the above is a general outline of the process, there are of course, various separation and purification steps involved. A waste solution is produced which contains substantial amounts of uranium. This solution has been, in some instances at least, stored in large ponds or lagoons. The uranium concentration is too high to permit direct discharge into sewers, and, moreover, the uranium, being in the enriched form, has considerable economic value. It is therefore highly desirable to provide a simple, economic process for the recovery of sufficient uranium to reduce the concentration to a value low enough to permit its discharge into the sewers and to obtain the uranium in a form from which it can be recovered and converted into $UO_2$.

SUMMARY OF THE INVENTION

In one plant, employing the ammonium diuranate process, the accumulated waste solution amounts to several million gallons and contains, in parts per million of the solution, several hundred parts of uranium, several tens of thousands parts of fluoride ion, nitrate ion, sulphate ion, and ammonium ion, and substantial quantities of sodium and silicon. It also contains aluminum, which although present in very small quantities, forms a troublesome gelatinous precipitate if the pH of the solution is raised above about eight. Since uranium (IV) fluoride is insoluble, it had been considered that the uranium could be precipitated by reduction to the +4 valence state (in the solution, it is in the valence six state). Various reductants were investigated: Hydrazine, hydroxyl amine, sulfur dioxide, aluminum metal, and sodium hydrosulfite, $Na_2S_2O_4$. Reduction by aluminum metal was very slow and this process was abandoned. Sulfur dioxide showed some promise, but the uranium reduction did not go to completion. Both hydrazine and hydroxyl amine did not prove to be effective and some time lag in the reduction time was apparent. In addition, both hydrazine and hydroxyl amine are bases which cause the pH to increase upon their addition. At a pH much above eight aluminum in the waste water begins to precipitate as the hydroxide. Addition of excess hydroxyl amine or hydrazine can cause this to occur, thus contaminating the uranium precipitate with aluminum. Sodium hydrosulfite produces a good precipitation and the pH changes insignificantly with its addition. Although good results are obtained in the pH range of four to eight, optimum recovery is obtained at a pH of approximately six. The precipitate was originally believed to be $UF_4$, but on further investigation, it has been found to be a complex salt, having the formula $NaNH_4UF_6$. This compound, after dissolution in, for example, nitric acid or aqueous aluminum nitrate nonahydrate, $Al(NO_3)_3 \cdot 9H_2O$ (ANN) or a mixture of the two, and purification, can be returned to the ammonium diuranate cycle.

The method is, however, of broader applicability and can be advantageously applied to other solutions of uranium where at least a substantial portion is in the U(VI) state. The presence of ammonium and fluoride ions is necessary for the precipitation but, if the solution does not contain them, they can be added. Generically then, this process is applicable to the recovery of uranium from solutions containing U(VI), by precipitation, caused by adding sodium hydrosulfite, $Na_2S_2O_4$, to the solution in the presence of ammonium ions and fluoride ions.

DETAILED DESCRIPTION

Example 1

A series of large scale experiments were conducted on solutions from lagoons located on the plant of Exxon Nuclear Company, located at Richland, Wash. The lagoons contained several million gallons of waste comprising about 350 to 540 parts per million, ppm, uranium; about 20,000 ppm fluoride ($F^-$); about 35,000 to 50,000 ppm nitrate ($NO_3^-$); slightly over 150,000 ppm sulfate ($SO_4^{2-}$); and about 80,000 to 90,000 ppm ammonium ($NH_4^+$). They also contained about 600 ppm silicon and small but significant amounts of zirconium and from 27 to 440 ppm sodium.

Solutions were pumped to the precipitator, which was a 7,000 gallon plastic tank with two agitators on a common axis, one near the top of the tank, and one near the bottom. The process was operated on a batch basis. A blend of 60% lagoon solution and 40% water was delivered to the precipitator, together with a concentrated solution of 50 pounds of sodium hydrosulfite. This was found to give a strongly reducing solution potential of about $-500$ mv when measured with a platinum redox electrode, which was used for process control, about $-300$ mv relative to a normal hydrogen electrode. The mixture was agitated for about two hours and allowed to settle for about 16 hours. The waste supernatant in the precipitator was pumped to a different lagoon through a 1-3 micron filter. The procedure of charging, precipitating, and decanting the precipitator was repeated until a satisfactory mass of precipitate was accumulated. The maximum mass was limited by criticality safety specifications.

Several of the precipitations were failures. It appeared that this was caused by starting the agitator before the tank was completely full. This apparently caused undue aeration and oxidation of the reductant. The procedure was then modified to (1) add the sodium hydrosulfite when the precipitator was nearly full, and (2) start the precipitator agitator after the vessel was completely filled. No precipitation failures occurred after these changes in operating procedures.

Some improvement in waste losses was produced when the dilution was increased to 50% water and 50% solution. Concentrations of 6 to 18 ppm uranium in the waste stream were obtained. During the decantation, about 5,450 gallons were removed, leaving a "heel" in the bottom of the tank of about 65 gallons.

The precipitation and decantation steps were repeated until the precipitator contained about 150 gallons of the slurry of the precipitate. The slurry was pumped to the washer, which was a 350 gallon agitated tank. The filters through which the supernatant was pumped were washed, the washings allowed to settle, the wash solution decanted, and the remaining slurry added to the washer. To assist in the pumping of the slurry from the precipitator, additional water was added. The amount of resulting slurry received in the washer ranged from 200 to 300 gallons. After settling overnight, te supernatant was pumped through the 1-3 micron filter to the precipitator tank. Wash water was then added to the washer, and the agitator operated for about 10 to 15 minutes. The washing and settling were repeated. Each batch was washed several times with 120 to 160 gallons of water. Following the final wash, the product was drained by gravity from the washer to a drum. The product slurry was screened during the addition to the drum to remove the large bugs, bits of plastic and paper, and large bits of iron from agitator corrosion. (The black iron agitators in the precipitator and washer corroded badly. Numerous iron flakes sloughed off the agitators and contaminated the product. Following this series of tests, a stainless steel agitator was installed and operated without noticeable corrosion).

At the conclusion of the experiment, solution containing about 100 kg of uranium had been treated and about 93 kg recovered. About 570 kg of $Na_2S_2O_4$ was used, about 8 times the stoichiometric amount.

The precipitate was dissolved in a 50% aqueous solution of aluminum nitrate nonahydrate, $Al(NO_3)_3.9H_2O$ (ANN), using three volumes of the ANN solution to one volume of precipitate. This forms a solution of uranyl nitrate hexahydrate, $UO_2(NO_3)_2.6H_2O$ (UNH), containing 100-125 g/l uranium. The UNH was purified by solvent extraction using a 30% solution of tributyl phosphate in hydrocarbon diluent and recycled to the precipitation step of the ADU process. In laboratory experiments, the precipitate was also dissolved in 4M $HNO_3$ and in a solution which was 2M ANN and 1M $HNO_3$. Solutions containing ANN gave more rapid dissolution.

The $Na_2S_2O_4$ used in the above experiment amounted to about 1.1 g/l. As noted above, this gave a reducing potential of about −500 mv against a platinum redox electrode (about −300 mv relative to the normal hydrogen electrode, NHE). Little change was produced by doubling or halving the concentration of the $Na_2S_2O_4$. Below 0.5 g/l, however, the reducing potential fell off rapidly. Laboratory experiments showed that the loss of uranium to the filtrate increased with concentration of fluoride and sulfate in the feed. It was therefore desirable to dilute the lagoon solution, as was done in Example 1.

It has been found that adding sodium ion to the solution decreases the loss of uranium to the filtrate, particularly when, as in these lagoon solutions, the concentrations of sulfate and fluoride are comparatively high, i.e., above about 1 to 1.5M.

Example 2

In experiments involving lagoon solution, of the type discussed above, containing 219 ppm uranium, $Na_2S_2O_4$ was added to the undiluted solution in amounts of 0.50, 0.80 and 1.10 g/l and the effect of adding NaCl or $NaNO_3$ was studied. The following average results were obtained:

| Concentration of Added Salt, M | | U in Filtrate, ppm |
|---|---|---|
| NaCl | $NaNO_3$ | |
| — | — | 25 |
| 0.05 | — | 8 |
| 0.1 | — | 6 |
| 0.25 | — | 4 |
| 0.5 | — | 2.5 |
| — | 0.2 | 2.5 |

Thus, by adding sufficient sodium nitrate or chloride to bring the concentration to 0.05 molar, the loss of uranium can be greatly reduced. Other sodium salts having non-interferring anions, e.g. sodium acetate, may be substituted but, since sodium chloride is so cheap and is unobjectionable from a disposal standpoint, there is no technical or economic reason to use another salt.

While the process has been described in connection with the recovery from waste solutions derived from the ammonium diuranate process, it is of a broader application. The process is especially applicable for recovery of uranium from solutions that have a low uranium content (i.e., a few hundred ppm U), but it is not limited to such solutions since uranium can be precipitated from solutions of higher concentration with the same reductant. It is necessary for the precipitation that fluoride ion and ammonium ion be present in excess of stoichiometric proportions, but they need not have been originally present in the solution. If not present, then they can be added. The addition of sodium hydrosulphite will produce a precipitation, which is the basic feature of this invention.

We therefore wish our patent coverage to be limited solely by the scope of the appended claims.

What is claimed is:

1. A process of separating uranium from a dilute waste solution derived from the ammonium diuranate process of converting $UF_6$ to $UO_2$ and containing U(VI), fluoride ion, and ammonium ion, which comprises adding sodium hydrosulfite to said solution and recovering a precipitate containing fluorine, sodium, ammonium, and U(IV).

2. A process as defined in claim 1 wherein said solution contains uranium in the proportion of a few hundred parts per million, fluoride in the amount of several tens of thousands parts million, and sulfate in the amount of about 50 up to several hundred thousand parts per million.

3. A process as defined in claim 1, wherein sufficient sodium hydrosulfite is added to give strongly reducing conditions.

4. A process as defined in claim 2, wherein sufficient sodium hydrosulfite is added to give a solution potential of about minus 300 millivolts relative to a normal hydrogen electrode.

5. A process as defined in claim 1, and further comprising adding sufficient sodium salt to render the solution at least about 0.05 molar in said salt.

6. A process as defined in claim 2, and further comprising adding sufficient sodium salt to make said solution at least 0.05 molar in said salt.

7. A process as defined in claim 5 wherein said salt is sodium nitrate or sodium chloride.

8. A process as defined in claim 6, wherein said sodium salt is sodium nitrate or sodium chloride.

9. A process as defined in claim 5, wherein said sodium salt is sodium chloride.

10. A process as defined in claim 6, wherein said sodium salt is sodium chloride.

11. A process as defined in claim 1 and further comprising dissolving said precipitate in an aqueous solution of aluminum nitrate nonahydrate.

* * * * *